(12) United States Patent
Pan et al.

(10) Patent No.: US 12,159,245 B2
(45) Date of Patent: Dec. 3, 2024

(54) METHOD AND SYSTEM FOR PREDICTING A DAY-AHEAD WIND POWER OF WIND FARMS

(71) Applicants: Economic and Technological Research Institute of State Grid Liaoning Electric Power Co., Ltd., Liaoning (CN); State Grid Corporation of China, Beijing (CN); Northeast Electric Power University, Jilin (CN)

(72) Inventors: Xiao Pan, Liaoning (CN); Mingli Zhang, Liaoning (CN); Lin Zhao, Liaoning (CN); Na Zhang, Liaoning (CN); Zhuoran Song, Liaoning (CN); Nantian Huang, Jilin (CN); Jing Gao, Liaoning (CN); Xuming Lv, Liaoning (CN); Hua Li, Liaoning (CN); Mengzeng Cheng, Liaoning (CN); Xing Ji, Liaoning (CN); Wenying Shang, Liaoning (CN); Yixin Hou, Liaoning (CN); Suo Yang, Liaoning (CN); Bo Yang, Liaoning (CN); Yutong Liu, Liaoning (CN); Linkun Man, Liaoning (CN); Xilin Xu, Liaoning (CN); Haifeng Yang, Liaoning (CN); Fangyuan Yang, Liaoning (CN); Kai Liu, Liaoning (CN); Jinqi Li, Liaoning (CN); Zongyuan Wang, Liaoning (CN)

(73) Assignees: Economic and Technological Research Institute of State Grid Liaoning Electric Power Co., Ltd., Shenyang (CN); State Grid Corporation of China, Beijing (CN); Northeast Electric Power University, Jilin (CN)

( * ) Notice: Subject to any disclaimer, the term of this patent is extended or adjusted under 35 U.S.C. 154(b) by 446 days.

(21) Appl. No.: 17/652,681

(22) Filed: Feb. 26, 2022

(65) Prior Publication Data
US 2023/0136352 A1 May 4, 2023

(30) Foreign Application Priority Data
Oct. 29, 2021 (CN) .......................... 202111270931.X (51) Int. Cl.
*G06Q 10/04* (2023.01)
*G06F 17/15* (2006.01)
(Continued)

(52) U.S. Cl.
CPC .......... *G06Q 10/04* (2013.01); *G06F 18/211* (2023.01); *G06F 18/2133* (2023.01);
(Continued)

(58) Field of Classification Search
CPC ...... G06Q 10/04; G06Q 50/06; G06F 18/211; G06F 17/15; G06F 18/23213; G06F 2113/06; G06N 3/0475
See application file for complete search history.

(56) References Cited

FOREIGN PATENT DOCUMENTS

CN 104299044 A * 1/2015 ....... G06Q 10/06375
CN 110619360 A * 12/2019
(Continued)

OTHER PUBLICATIONS

Huang, "Wind Power Prediction considering Ramping Events Based on Generative Adversarial Network" Hindawi Journal of Electrical and Computer Engineering vol. 2021, Article ID 5516909 (Year: 2021).*

(Continued)

*Primary Examiner* — John C Kuan
(74) *Attorney, Agent, or Firm* — MagStone Law, LLP; Enshan Hong (57) ABSTRACT

A method for predicting a day-ahead wind power of wind farms, comprising: constructing a raw data set based on a
(Continued)

correlation between the to-be-predicted daily wind power, the numerical weather forecast meteorological feature and a historical daily wind power; obtaining a clustered data set and performing k-means clustering, obtaining a raw data set with cluster labels, and generating massive labeled scenes based on robust auxiliary classifier generative adversarial networks; determining the cluster label category of the to-be-predicted day based on the known historical daily wind power and numerical weather forecast meteorological feature, and screening out multiple scenes with high similarity to the to-be-predicted daily wind power based on the cluster label category; and obtaining the prediction results of the to-be-predicted daily wind power at a plurality of set times based on an average value, an upper limit value and a lower limit value of the to-be-predicted daily wind power.

18 Claims, 6 Drawing Sheets

(51) Int. Cl.
    *G06F 18/211*     (2023.01)
    *G06F 18/2133*     (2023.01)
    *G06F 18/23213*     (2023.01)
    *G06N 3/0475*     (2023.01)
    *G06Q 50/06*     (2024.01)
    *G06F 113/06*     (2020.01)

(52) U.S. Cl.
    CPC .............. *G06Q 50/06* (2013.01); *G06F 17/15* (2013.01); *G06F 18/23213* (2023.01); *G06F 2113/06* (2020.01); *G06N 3/0475* (2023.01)

(56) References Cited

FOREIGN PATENT DOCUMENTS

CN     113269314 A  *  8/2021  ........... G06F 16/214
CN     113516315 A  *  10/2021

OTHER PUBLICATIONS

Jiang et al., "Scenario Generation for Wind Power Using Improved Generative Adversarial Networks" IEEE Access, vol. 6, 2018 (Year: 2018).*
Wang et al., "Generative adversarial networks and convolutional neural networks based weather classification model for day ahead short-term photovoltaic power forecasting" Energy Conversion and Management 181 (2019) 443-462 (Year: 2019).*
Zhang et al., "Typical wind power scenario generation for multiple wind farms using conditional improved Wasserstein generative adversarial network" Electrical Power and Energy Systems 114 (2020) 105388 (Year: 2020).*
Chen et al., "Model-Free Renewable Scenario Generation Using Generative Adversarial Networks" IEEE Transactions on Power Systems, vol. 33, No. 3, May 2018) (Year: 2018).*
Fu et al., "Ultra-Short Term Power Prediction of Offshore Wind Power Based on Improved LSTM-TCN Model," Proceedings of the CSEE, 2009, pp. 1-13.
Ma et al., "Short-term Wind Power Prediction with Dual Targets Considering the Threshold of Meteorological Characteristic Fluctuation Partition," High Voltage Engineering, Apr. 2022, pp. 1-12.
Fu et al., "Offshore Wind Power Forecasting Considering Meteorological Similarity and NWP Correction," China Academic Journal Electronic Publishing House, 2019, pp. 1-8.

* cited by examiner

METHOD AND SYSTEM FOR PREDICTING A DAY-AHEAD WIND POWER OF WIND FARMS

CROSS REFERENCE TO RELATED APPLICATIONS

This application claims priority of China Application No. 202111270931.X filed on Oct. 29, 2021, the entirety of which is hereby incorporated by reference.

TECHNICAL FIELD

The present invention relates to the technical field of wind power generation, in particular to a method and system for predicting a day-ahead wind power of wind farms.

BACKGROUND OF THE INVENTION

In recent years, the renewable energy represented by wind power has attracted more and more attention. Different from the traditional power generation, the wind power generation has the feature of complexity and instability. With the continuous increase of the assembled capacity of wind turbines, the strong randomness and fluctuation of its output have brought trouble to the safe and stable operation of the power system. In order to optimize the power grid dispatch and improve the efficiency of wind farms, the accurate prediction of wind power is extremely important. At present, the current technical solution for wind power prediction based on physical methods is as follows: a combined weighted wind power prediction model is established based on the spatial correlation of meteorological factors and wind speed in numerical weather prediction; a wind speed correction model of numerical weather prediction based on Gaussian process is established because of the low accuracy of wind speed in numerical weather prediction data, and it is taken into other meteorological factors, including wind direction, temperature, humidity, air pressure, etc., so as to predict wind power; furthermore, the delay time of the maximum correlation coefficient point is calculated based on the spatial correlation analysis of wind speed between the target wind farm and adjacent wind farms, and the spatial correlation prediction model of wind speed is established; a combined weighted prediction model is established based on the wind power prediction model with deviation correction of numerical weather prediction and spatial correlation prediction model; then, the weighted values of each single model in the combined model are obtained by Lagrange multiplier method, and the predicted wind power is obtained.

However, it is a failure of utilizing wind power prediction based on physical methods to find the inherent rules from multi-source, multi-dimensional and multi-modal data, and to mine the relationship between the historical data, so that prediction results is inaccurate. Furthermore, the wind power prediction model based on physical methods has a complex structure and cumbersome calculation process.

SUMMARY OF THE INVENTION

In order to solve the problems that the existing wind power prediction results based on physical methods are not accurate enough, the prediction model structure is complex and the calculation process is cumbersome, the present invention provides a method for predicting a day-ahead wind power of wind farms, comprising:

constructing a raw data set containing a numerical weather forecast meteorological feature and a to-be-predicted daily wind power based on a correlation between the to-be-predicted daily wind power, the numerical weather forecast meteorological feature and a historical daily wind power;

removing the to-be-predicted daily wind power in the raw data set, obtaining a clustered data set and performing k-means clustering, obtaining a raw data set with cluster labels, and generating massive labelled scenes based on robust auxiliary classifier generative adversarial networks;

determining the cluster label category of the to-be-predicted day based on the known historical daily wind power and numerical weather forecast meteorological feature, and screening out multiple scenes with high similarity to the to-be-predicted daily wind power from the massive labelled scenes based on the cluster label category, forming a similar scene set; and obtaining the point prediction and interval prediction results of the to-be-predicted daily wind power at a plurality of set times based on an average value, an upper limit value and a lower limit value of the to-be-predicted daily wind power in the similar scene set.

The present invention also provides a system for predicting a day-ahead wind power of wind farms, comprising:

a construction module for constructing a raw data set containing a numerical weather forecast meteorological feature and a to-be-predicted daily wind power based on a correlation between the to-be-predicted daily wind power, the numerical weather forecast meteorological feature and a historical daily wind power;

a cluster generation module for removing the to-be-predicted daily wind power in the raw data set, obtaining a clustered data set and performing k-means clustering, obtaining a raw data set with cluster labels, and generating massive labelled scenes based on robust auxiliary classifier generative adversarial networks;

a screening composition module for determining the cluster label category of the to-be-predicted day based on the known historical daily wind power and numerical weather forecast meteorological feature, and screening out multiple scenes with high similarity to the to-be-predicted daily wind power from the massive labelled scenes based on the cluster label category, forming a similar scene set; and a prediction module for obtaining the point prediction and interval prediction results of the to-be-predicted daily wind power at a plurality of set times based on an average value, an upper limit value and a lower limit value of the to-be-predicted daily wind power in the similar scene set.

The present invention also provides a computer device comprising a memory, a processor and a computer program stored in the memory and running on the processor, and the following steps are implemented when the computer program is executed by the processor:

constructing a raw data set containing a numerical weather forecast meteorological feature and a to-be-predicted daily wind power based on a correlation between the to-be-predicted daily wind power, the numerical weather forecast meteorological feature and a historical daily wind power;

removing the to-be-predicted daily wind power in the raw data set, obtaining a clustered data set and performing k-means clustering, obtaining a raw data set with cluster labels, and generating massive labelled scenes based on robust auxiliary classifier generative adversarial networks;

determining the cluster label category of the to-be-predicted day based on the known historical daily wind power and numerical weather forecast meteorological feature, and screening out multiple scenes with high similarity to the to-be-predicted daily wind power from the massive labelled scenes based on the cluster label category, forming a similar scene set; and obtaining the point prediction and interval prediction results of the to-be-predicted daily wind power at a plurality of set times based on an average value, an upper limit value and a lower limit value of the to-be-predicted daily wind power in the similar scene set.

The present invention also provides a computer-readable storage medium on which a computer program is stored, and the following steps are implemented when the computer program is executed by the processor:

constructing a raw data set containing a numerical weather forecast meteorological feature and a to-be-predicted daily wind power based on a correlation between the to-be-predicted daily wind power, the numerical weather forecast meteorological feature and a historical daily wind power;

removing the to-be-predicted daily wind power in the raw data set, obtaining a clustered data set and performing k-means clustering, obtaining a raw data set with cluster labels, and generating massive labelled scenes based on robust auxiliary classifier generative adversarial networks;

determining the cluster label category of the to-be-predicted day based on the known historical daily wind power and numerical weather forecast meteorological feature, and screening out multiple scenes with high similarity to the to-be-predicted daily wind power from the massive labelled scenes based on the cluster label category, forming a similar scene set; and obtaining the point prediction and interval prediction results of the to-be-predicted daily wind power at a plurality of set times based on an average value, an upper limit value and a lower limit value of the to-be-predicted daily wind power in the similar scene set.

The method and system for predicting a day-ahead wind power of wind farms provided in the present invention constructs a raw data set containing a to-be-predicted daily wind power, a numerical weather forecast meteorological feature and a historical daily wind power through the Pearson correlation coefficient, constructs a raw data set of the label based on a clustering algorithm, and designs the scene generation model based on the improved robust auxiliary classification generative adversarial network, generates a large number of labelled samples, determines the cluster label category of the to-be-predicted day based on the known historical daily wind power and numerical weather forecast meteorological feature, screens out the scenes with high similarity to the to-be-predicted daily wind power based on the cluster label category, and then obtains the point prediction and interval prediction results of the to-be-predicted daily wind power, so as to improve the accuracy of point prediction and interval prediction of the wind power, so that compared with the traditional WGP interval prediction method, the prediction result of the present invention is more accurate and effective.

DETAILED DESCRIPTION OF PREFERRED EMBODIMENTS

The technical scheme of the present invention is further described below through the accompanying drawings and the preferred embodiment.

Figure 4:
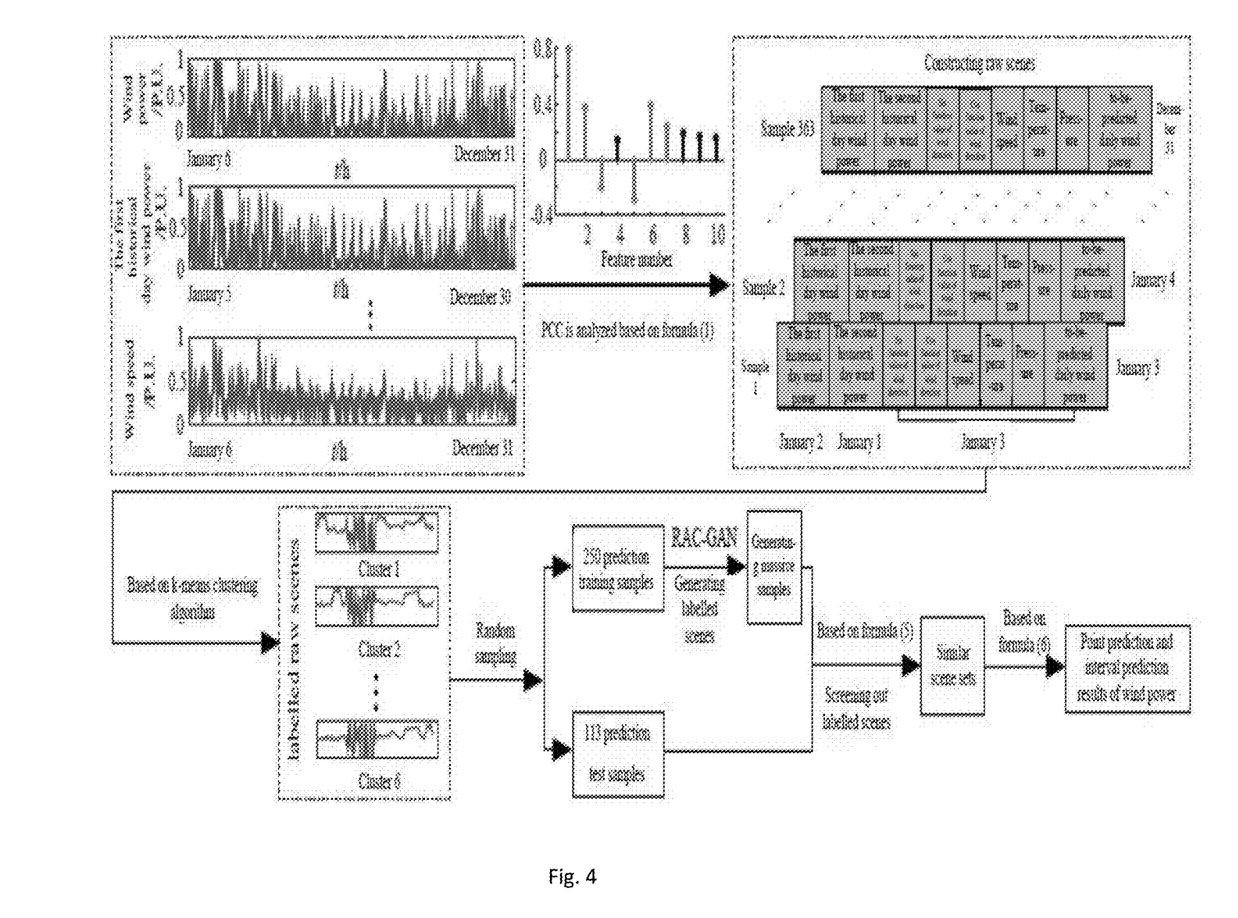
FIG. 4 is a flow schematic diagram of predicting the day-ahead wind power of wind farms provided in the preferred embodiment of the present invention.
Figure 5:
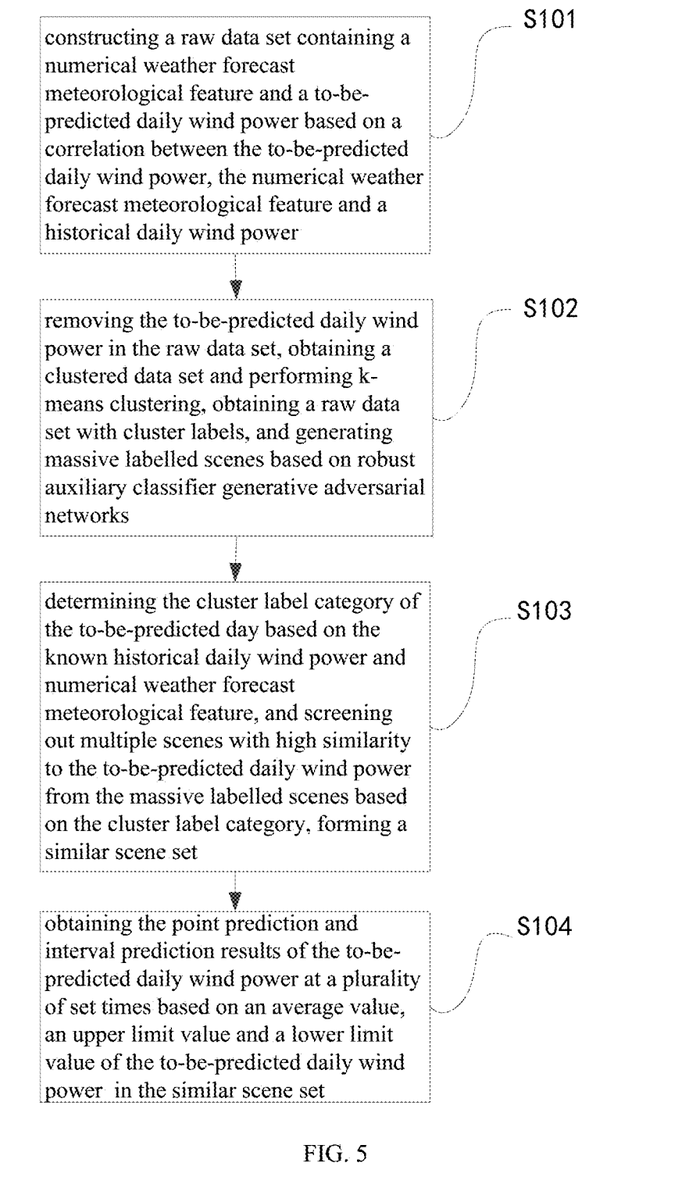
FIG. 5 is a method flow chart of predicting the day-ahead wind power of wind farms provided in the preferred embodiment of the present invention.

Referring to FIG. 4 and FIG. 5, the method for predicting a day-ahead wind power of wind farms provided in the preferred embodiment of the present invention specifically comprises the following steps:

Step S101: constructing a raw data set containing a numerical weather forecast meteorological feature and a to-be-predicted daily wind power based on a correlation between the to-be-predicted daily wind power, the numerical weather forecast meteorological feature and a historical daily wind power.

In specific applications, the wind power is affected by the wind speed, the wind direction, the temperature, the humidity, the pressure and the historical daily wind power. The small local morphological differences can be analyzed by using Pearson correlation coefficient (PCC) without normalizing the wind power data, and the correlation between the wind power and various impact features can be better analyzed. The calculation formula of PCC is shown in the following formula (1):

$$PCC(x, y_i) = 1 - \frac{\sum_{k=1}^{n}(x_k - \bar{x})(y_{ik} - \bar{y_i})}{\sqrt{\sum_{k=1}^{n}(x_k - \bar{x})}\sqrt{\sum_{k=1}^{n}(y_{ik} - \bar{y_i})}} \quad (1)$$

wherein, x is the to-be-predicted daily wind power, $y_i$ is an impact feature of the to-be-predicted daily wind power;

$x_k$ and $y_{ik}$ are the k-th data in X and $y_i$; $\bar{x}$ and $\bar{y}_i$ are the average values of x and $y_i$; k and n are positive integers.

Selecting a wind speed, a wind direction, a temperature, a humidity and a pressure as a first primary selection feature of the to-be-predicted daily wind power; at the same time, considering that the to-be-predicted daily wind power is affected by the historical daily wind power, based on the Pearson correlation coefficient, analyzing the correlation between each historical daily wind power and the to-be-predicted daily wind power, selecting a historical daily wind power with an absolute value of the Pearson correlation coefficient greater than a preset threshold as a second primary selection feature of the to-be-predicted daily wind power. For example, selecting the wind power within five historical days as the second primary selection feature in the preferred embodiment. The above selected ten primary selection features are set as the impact features of the to-be-predicted daily wind power at time t, and the ten impact features are numbered from 1 to 10 respectively corresponding to the wind speed, the wind direction, the temperature, the humidity, the pressure, the first historical day wind power at time t, the second historical day wind power at time t, the third historical day wind power at time t, the fourth historical day wind power at time t and the fifth historical day wind power at time t, and calculating the Pearson correlation coefficient between the to-be-predicted daily wind power and the ten primary selection features respectively. The PCC between the to-be-predicted daily wind power time series and each impact feature time series is shown in FIG. 1.

Figure 1:
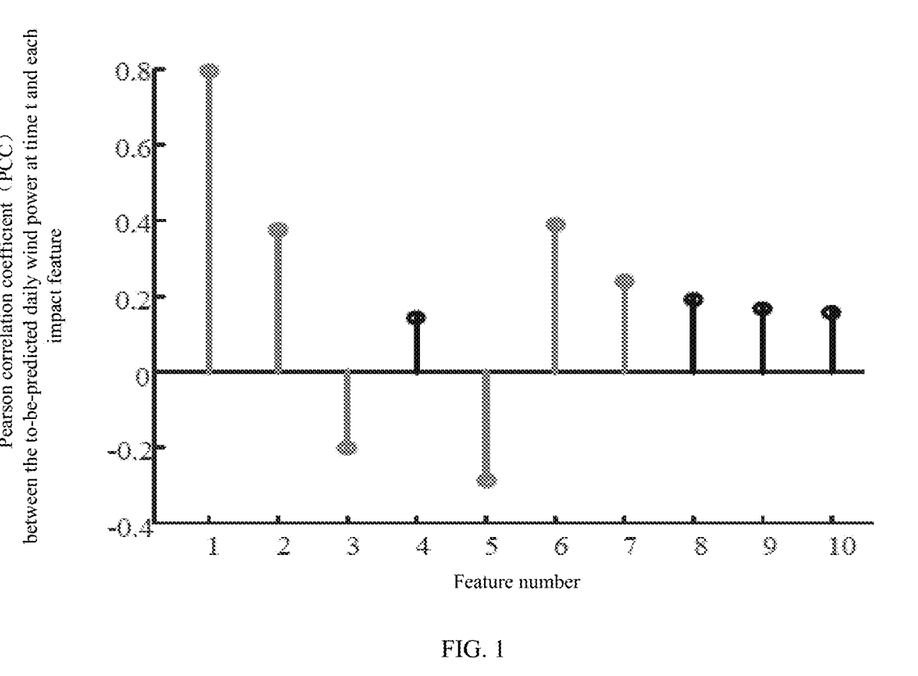
FIG. 1 is a schematic diagram of the correlation between the to-be-predicted daily wind power at time t and each impact feature provided in the preferred embodiment of the present invention.

As shown in FIG. 1, the strength of the correlation between the to-be-predicted daily wind power and its impact features can be determined by comparing $|PCC(x,y)|$ with the preset threshold: assuming that the preset threshold is 0.2, when $|PCC(x,y)| \in [0,0.2]$, it represents a very weak correlation or no correlation; When $|PCC(x,y)| \in (0.2,0.4]$, it represents a weak correlation; When $|PCC(x,y)| \in (0.4,0.6]$, it represents a medium correlation; When $|PCC(x,y)| \in (0.6,0.8]$ it represents a strong correlation; When $|PCC(x,y)| \in (0.8,1]$, it represents an extremely strong correlation. When $PCC(x, y)$ is positive, it represents a positive correlation; when $PCC(x, y)$ is negative, it represents a negative correlation. The wind power has a strong fluctuation, and there are many factors that affect the wind power output. In order to ensure the accuracy of the wind power prediction, it is necessary to remove the extremely weak correlation and uncorrelated features, and the rest of the features are used for the impact features of the to-be-predicted daily wind power prediction, comprising 6-dimensional features of the wind speed, the wind direction, the temperature, the pressure, the first historical day wind power and the second historical day wind power. Wherein, the correlation between the temperature, the pressure and the to-be-predicted daily wind power is negative. That is, if other factors remain unchanged, when the temperature and pressure increase, the wind power decreases, and the correlation between the remaining features and the to-be-predicted daily wind power is positive.

Figure 2:
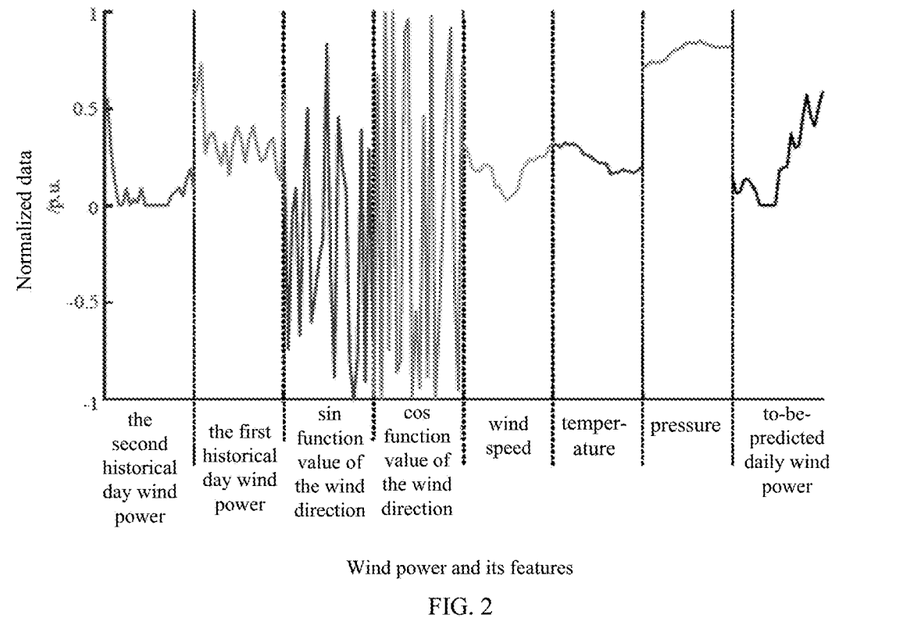
FIG. 2 is a sample format of a raw data set containing the to-be-predicted daily wind power and its impact feature provided in the preferred embodiment of the present invention.

Based on the 6-dimensional features determined by data analysis, the predicted corresponding features of the data set are normalized to obtain five normalized feature data and two trigonometric function feature data. The normalized feature of each dimension and the to-be-predicted daily wind power data are integrated into one row of raw data containing 24×8 data points in turn in the order of the to-be-predicted daily wind speed, sin function value of the wind direction, cos function value of the wind direction, the temperature and the pressure, the first historical day wind power, the second historical day wind power and the to-be-predicted daily wind power. The data of 365 days in a year are constructed as 363 raw data samples, 250 raw data are randomly selected to form the raw data set, and the remaining 113 raw data are used as the test set. The sample format of the raw data set is shown in FIG. 2.

It should be noted that the preset threshold and the prediction time t of the day to be predicted can be set in accordance with the actual prediction requirements.

Step S102: removing the to-be-predicted daily wind power in the raw data set, obtaining a clustered data set and performing k-means clustering, obtaining a raw data set with cluster labels, and generating massive labelled scenes based on robust auxiliary classifier generative adversarial networks.

The raw data set contains various types of features such as numerical weather forecast meteorological features and historical daily wind power and so on, and there are large differences between different scenes. In order to achieve the accuracy of wind power prediction, clustering the features that affect the to-be-predicted daily wind power, and obtaining multi-cluster labels and assigning each scene in the raw data set to the label, so as to facilitate the targeted screening of similar scenes in the corresponding cluster label generation scene based on NWP (numerical weather prediction) meteorological features and historical daily wind power when predicting, for the purpose of improving the accuracy of wind power prediction.

The K-means clustering algorithm has the advantages of simple processing of large data sets and fast operation speed, and it has the obvious feature differences between clustered classes after clustering and the better clustering effect. The K-means clustering is to cluster n data objects into k classes (n and k are positive integers), so that the similarity of data objects in each class is the highest. This process is repeated until the division is completed. The algorithm steps are as follows: 1) determining the number of clusters k, and arbitrarily select k initial clustering centers in the data; 2) calculating the distance from all data points to the cluster center, and classify the data into the categories in accordance with the principle of minimum distance; 3) iteratively updating the central value of each type by using mean value method based on the feature of each type until the end of the iteration.

Figure 3:
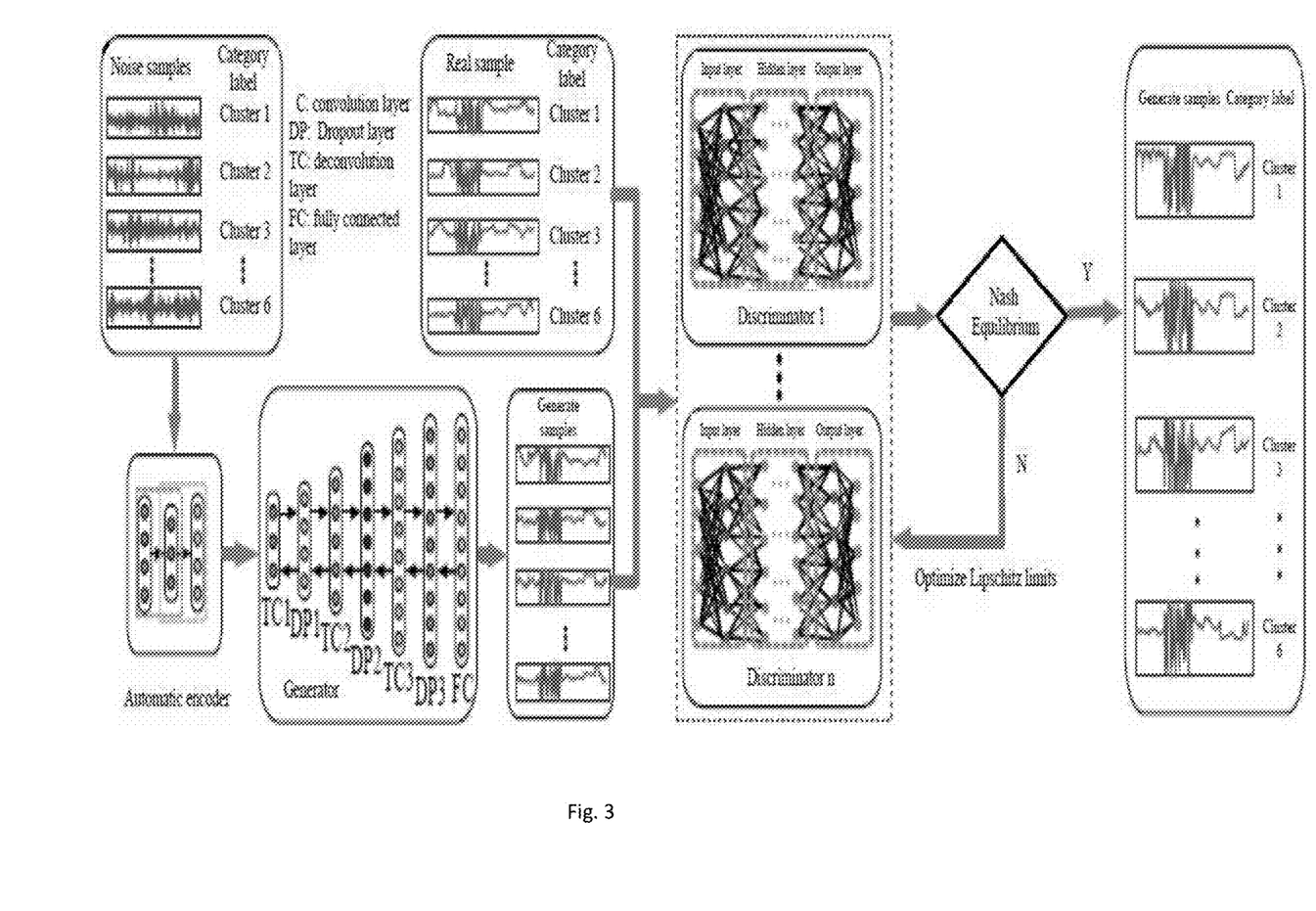
FIG. 3 is a schematic diagram of the RAC-GAN model provided in the preferred embodiment of the present invention.

In order to solve the impact of NWP error on wind power prediction and the impact of limited training sample data on the accuracy of wind power prediction, the embodiment of the present invention uses an improved robust auxiliary classifier generative adversarial network (RAC-GAN) to generate a large number of labelled samples of the wind power and its impact feature. In the complex scenarios where there is an error in NWP and actual meteorology, that is, in a noisy scenario, the RAC-GAN model shown in FIG. 3 is proposed in order to solve the problems of unstable features affecting wind power, difficult extraction and low accuracy of wind power prediction, and to meet the requirements of multi-label strong robustness scenario generation under the impact of NWP errors.

The auxiliary classifier generative adversarial networks (AC-GAN) is added with random noise signal labels and multi-classification functions on the basis of generative adversarial networks, so as to generate specified types of samples based on the labels. The generator G of AC-GAN is added with random noise signal Z and label C corresponding to the generative sample, and its generator generates corresponding category samples $X(fake)=G(c,z)$. The sample x output by the discriminator D comes from the real sample X(real), the probability P(S|X) of generating the sample X(fake) and the probability P(C|X) belonging to different categories, i.e $$[P(S|X), P(C|X)] = D(X) \quad (2)$$

In formula (2), S is the source of sample, X is the output sample; in C=c, c∈{1,2, . . . ,n}, n represents the number of sample classes. In AC-GAN, the objective function G is the maximized $L_C$–$L_S$, the objective function D is the maximized $L_C$+$L_S$, $L_S$ and $L_C$ are defined as follows:

$$\begin{cases} L_S = E[\log P(S = \text{real} \mid X_{real})] + E[\log P(S = \text{fake} \mid X_{fake})] \\ L_C = E[\log P(C = c \mid X_{real})] + E[\log P(C = c \mid X_{fake})] \end{cases} \quad (3)$$

In formula (3), $L_S$ is the correct source loss function, which can be used to determine the correctness of the data source; $L_C$ is the correct class loss function, which can be used to determine the correctness of the output category; E is the mathematical expectation. Through the internal game between the generator and the discriminator, they are optimized alternately in the iterative process, and finally the scene generation ability of the generator is improved.

In order to realize the need of multi-label wind power scene generation, a data encoder is introduced firstly into the generator input of AC-GAN, instead of directly using random noise signals, and the shallow raw data features are pre-learned by the model based on the real wind power and its impact feature data to obtain the random noise input. Then, the random noise is input to the generator to generate a large number of generated data that meet the probability distribution feature of the real samples, and the generated samples and raw samples are input to the discriminator, so as to determine the quality of the generated samples, and implement the expansion of the training sample data. In the iterative process of the RAC-GAN model, game optimization is carried out in the direction of reducing the impact of noise, and finally the robust scene generation of multi-labels under noise interference is realized.

Step S103: determining the cluster label category of the to-be-predicted day based on the known historical daily wind power and numerical weather forecast meteorological feature, and screening out multiple scenes with high similarity to the to-be-predicted daily wind power from the massive labelled scenes based on the cluster label category, forming a similar scene set.

The generated sample includes seven features affecting the to-be-predicted day wind power and the to-be-predicted day wind power. Five meteorological factor features can be obtained through NWP, and the first historical day wind power and the second historical day wind power are known. Therefore, the seven features affecting the to-be-predicted day wind power are known. To determine which type of cluster label the impact feature belongs to, based on the weighted PCC theory, multiple scenes with high similarity to the to-be-predicted daily wind power are selected from the generated samples of such cluster labels to form a similar scene set.

Step S104: obtaining the point prediction and interval prediction results of the to-be-predicted daily wind power at a plurality of set times based on an average value, an upper limit value and a lower limit value of the to-be-predicted daily wind power in the similar scene set.

In practical applications, the different impact features are different from the PCC of the to-be-predicted daily wind power, so the degree to which each impact feature affects the to-be-predicted daily wind power is different. Taking the PCC of the to-be-predicted daily wind power and each impact feature as the weight coefficient, setting the weighted PCC as $PCC_j$ of all the impact features of the to-be-predicted daily wind power and the corresponding feature of the j-th generated sample, and the expression is shown in formula (4):

$$PCC_j = \frac{\sum_{i=1}^{7} PCC(y_i, y_{ji}) \cdot PCC(x, y_i)}{\sum_{i=1}^{7} PCC(x, y_i)} \quad (4)$$

In formula (4), $PCC(x, y_i)$ is the PCC between the to-be-predicted daily wind power and the feature i; $PCC(y_i, y_{ji})$ is the PCC between the known feature i and the j-th generated sample feature i; $PCC_j$ is the weighted PCC between the j-th generated sample and the to-be-predicted daily feature.

Each impact feature of a certain to-be-predicted daily wind power is known, firstly, analyzing the cluster labels corresponding to these features based on the k-means clustering algorithm, and find the generated samples corresponding to the cluster labels; then, according to formula (4), selecting N samples with a high similarity to historical days with strong correlation of the day to be predicted from the generated samples of the cluster labels in the order of $PCC_j$ from large to small, forming a similar scene set, and the to-be-predicted daily wind power scene of the similar scene set is extracted and defined as set Z; finally, obtaining the point prediction and interval prediction results of the to-be-predicted daily wind power at a plurality of set times based on an average value, an upper limit value and a lower limit value of each time period in set Z, as shown in formula (5):

$$\begin{aligned} P_{wtmax,t} &= a(1, t) \quad a = \max[Z] \\ P_{wtmin,t} &= b(1, t) \quad b = \min[Z] \quad t = (1, 2, \ldots, 24) \\ P_{wtmean,t} &= c(1, t) \quad c = \text{mean}[Z] \end{aligned} \quad (5)$$

In formula (5), $P_{wtmax,t}$ and $w_{wtmin,t}$ are the upper limit value and lower limit value of interval prediction of the wind power at time t; $P_{wtmean,t}$ is the point prediction result of the wind power at time t.

In practical applications, in order to determine the required screening samples for predicting the wind power, the PICP (prediction interval coverage proportion) and PINAW (prediction interval normalized average width) are used to analyze the interval prediction effect under different screening samples, and the MAPE (mean absolute percentage error) is used to analyze the point prediction effect under different screening samples.

In order to verify the prediction effect of the prediction method provided in the preferred embodiment of the present invention, an experimental analysis is carried out by using the measured wind farm data in a certain region in Northeast China within one year.

The number of screening samples is set as 1%, 2%, 3%, 4% and 5% of the number of generated samples contained in each cluster label. The prediction indexes under different screening sample numbers are shown in Table 1.

According to the analysis of Table 1, the screening proportion of the optimal index cannot be directly selected, so the specified index can be awarded 5 points when it is the best and 1 point when it is the worst under the five screening proportions. Based on this rule, the scores obtained under different screening proportions are shown in the far right column of Table 1. When the number of screening samples is 4% of the number of samples generated by the corresponding cluster label, the prediction effect is the best.

TABLE 1

| The number of screening samples | MAPE/% | PICP/% | PINAW/% | Scores |
|---|---|---|---|---|
| 1% | 14.2 | 84.8 | 11.2 | 7.0 |
| 2% | 13.5 | 90.4 | 13.6 | 10.0 |
| 3% | 13.6 | 94.9 | 14.1 | 9.0 |
| 4% | 13.4 | 96.3 | 15.4 | 11.0 |
| 5% | 14.0 | 97.1 | 17.1 | 8.0 |

Since the uncertainty of the wind power itself is non-Gaussian, the traditional Gaussian process is not suitable for the wind power prediction, and the warped gaussian process (WGP), which has a better effect of the wind power interval prediction, is used to carry out comparative experiments. Run in the environment of MatlabR2015b, and the confidence levels are set to 90%, 95% and 99% respectively. By randomly selecting one week in each of the four seasons as a prediction experiment, the prediction indexes of the statistical prediction results of different prediction methods are obtained, as shown in Table 2 below.

TABLE 2

| Prediction Method | MAPE/% | PICP/% | PINAW/% |
|---|---|---|---|
| WGP (90% confidence level ) | 17.8 | 85.2 | 18.2 |
| WGP (95% confidence level ) | 17.8 | 89.2 | 22.1 |
| WGP (99% confidence level ) | 17.8 | 90.1 | 25.0 |
| Method provided in the preferred embodiment of the present invention | 13.4 | 96.3 | 15.4 |

Figure 6:
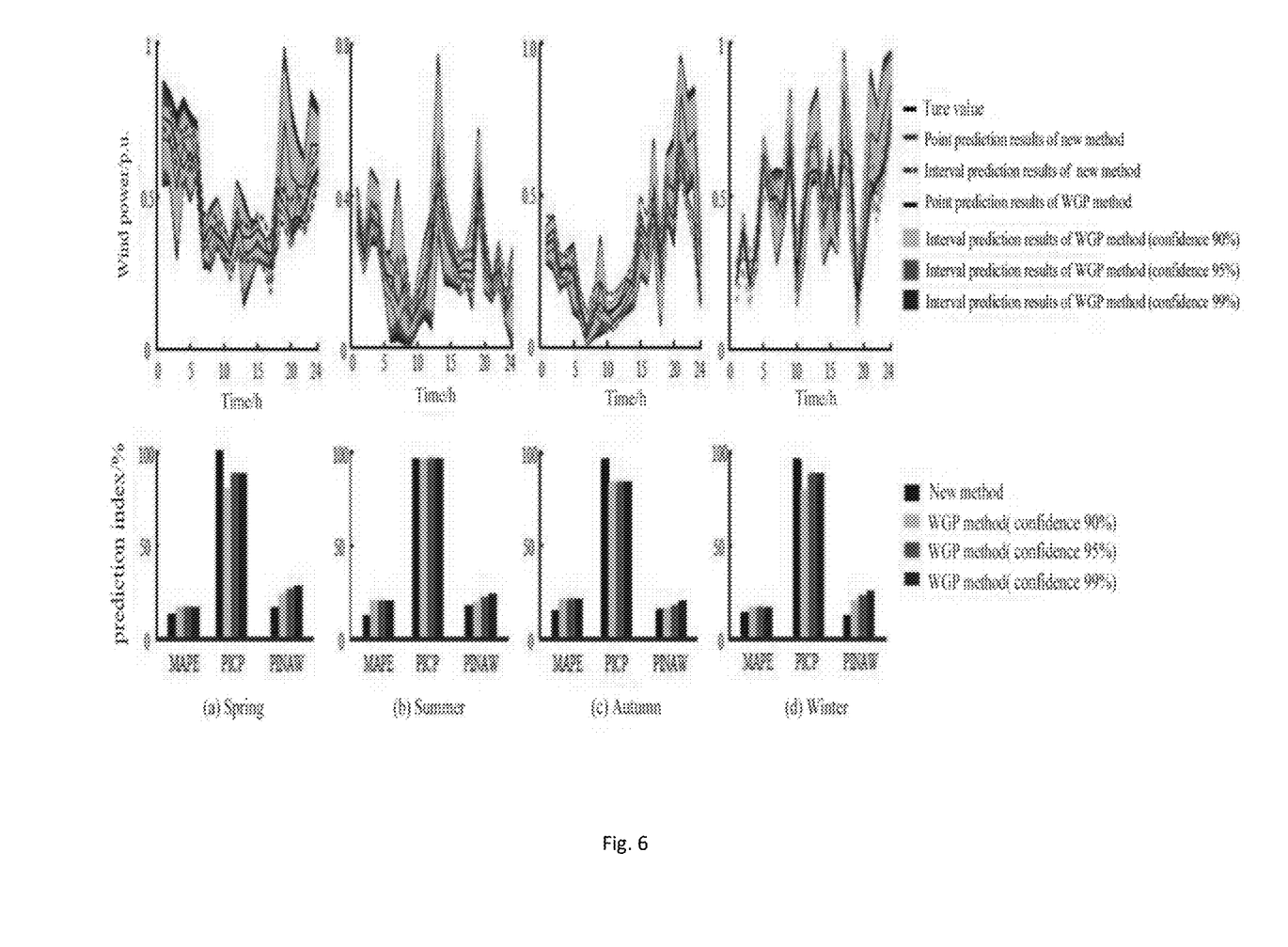
FIG. 6 is a schematic diagram of the comparison of the wind power prediction results and prediction indexes in four seasons between the method provided in the preferred embodiment of the present invention and the WGP method under different confidences.

According to the analysis of Table 2, each prediction index of the method provided in the preferred embodiment of the present invention is better than the prediction index of the WGP prediction method, which proves that the method provided in the preferred embodiment of the present invention has a good interval prediction effect. The wind power is greatly affected by the seasons, so the wind power prediction effect of the method provided in the preferred embodiment of the present invention and the WGP method under different confidence levels in the four seasons are respectively analyzed, and one day is randomly selected for prediction in each season. The prediction results of different methods are shown in FIG. 6. It can be seen from FIG. 6 that in the four days randomly selected in each season, the MAPE and PINAW of the prediction method provided in the preferred embodiment of the present invention are the minimum, and the PICP are the maximum. This is because a large number of generated scenes are obtained through scene generation first, and the similar scenes obtained through the screening of similar scenes by labeling are highly similar to the real scenes, so the percentage of prediction error is relatively low, the width of the prediction interval is relatively low, and the coverage rate of the prediction interval is relatively high. To sum up, in the study of predicting a day-ahead wind power, whether it is an experiment of selecting one week in each of the four seasons or randomly selecting one day in the four seasons, the method provided in the preferred embodiment of the present invention has certain advantages.

The features used in wind power prediction include the meteorological features obtained by NWP. There is an error between the NWP meteorological features and the real weather. The size of the error will directly affect the quality of screening similar scenes, and thus indirectly affect the prediction effect. In order to analyze the prediction effect of the method provided in the preferred embodiment of the present invention under different NWP errors, the noise is added to simulate the NWP error when the RAC-GAN scene is generated, and the signal-to-noise ratios are set as 20 dB, 25 dB, 30 dB, 35 dB and 40 dB respectively to simulate the NWP error. By using the new interval prediction method of wind power based on sub-label screening, the interval prediction indexes under different signal-to-noise ratios are obtained as shown in Table 3 below.

TABLE 3

| Signal-to-Noise Ratio/dB | MAPE/% | PICP/% | PINAW/% |
|---|---|---|---|
| 20 | 16.7 | 92.6 | 19.2 |
| 25 | 16.4 | 94.3 | 18.1 |
| 30 | 16.0 | 95.4 | 17.4 |
| 35 | 15.2 | 96.0 | 16.7 |
| 40 | 14.3 | 96.6 | 16.1 |

According to the analysis of Table 3, as the signal-to-noise ratio decreases, the noise is stronger, that is, the NWP error is larger, which is more and more unfavorable for the accuracy and stability of the prediction results, that is, the prediction effect is the worst at 20 dB, and the prediction index is also better than that of the WGP prediction method. It is proved that the prediction method provided in the preferred embodiment of the present invention can still ensure a good effect of interval prediction when there is a larger NWP error, and proves the practicality of the new interval prediction method of wind power based on the RAC-GAN scene generation provided in the preferred embodiment of the present invention.

The method for predicting a day-ahead wind power of wind farms in the preferred embodiment of the present invention constructs a raw data set containing a to-be-predicted daily wind power, a numerical weather forecast meteorological feature and a historical daily wind power through the Pearson correlation coefficient, constructs a raw data set of the label based on a clustering algorithm, and designs the scene generation model based on the RAC-GAN, generates a large number of labelled samples, determines the cluster label category of the to-be-predicted day based on the known historical daily wind power and numerical weather forecast meteorological feature, screens out the scenes with high similarity to the to-be-predicted daily wind power based on the cluster label category, and then obtains the point prediction and interval prediction results of the to-be-predicted daily wind power, so as to improve the accuracy of point prediction and interval prediction of the wind power, so that compared with the traditional WGP interval prediction method, the prediction result of the present invention is more accurate and effective. Furthermore, considering the differences between NWP and actual meteorological conditions, adding noise to simulate the NWP error is considered when constructing the scene generation model based on the RAC-GAN, and the prediction results are obtained under this condition. After simulation verification, the NWP error will slightly reduce the accuracy and reliability of the prediction results, but the prediction effect of the new method considering NWP error is still better than that of WGP method. It is verified that the method provided in the preferred embodiment of the present invention has stronger ability to bear NWP error, and the prediction results are less disturbed by external factors.

Figure 7:
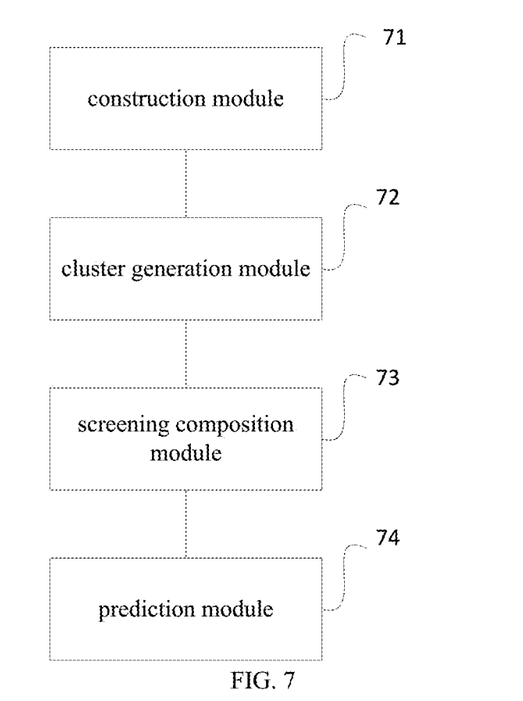
FIG. 7 is a structural diagram of the system for predicting the day-ahead wind power of wind farms provided in the preferred embodiment of the present invention.

Referring to FIG. 7, a system for predicting a day-ahead wind power of wind farms is provided in the preferred embodiment of the present invention, comprising:
- a construction module 71 for constructing a raw data set containing a numerical weather forecast meteorological feature and a to-be-predicted daily wind power based on a correlation between the to-be-predicted daily wind power, the numerical weather forecast meteorological feature and a historical daily wind power;
- a cluster generation module 72 for removing the to-be-predicted daily wind power in the raw data set, obtaining a clustered data set and performing k-means clustering, obtaining a raw data set with cluster labels, and generating massive labelled scenes based on robust auxiliary classifier generative adversarial networks;
- a screening composition module 73 for determining the cluster label category of the to-be-predicted day based on the known historical daily wind power and numerical weather forecast meteorological feature, and screening out multiple scenes with high similarity to the to-be-predicted daily wind power from the massive labelled scenes based on the cluster label category, forming a similar scene set; and
- a prediction module 74 for obtaining the point prediction and interval prediction results of the to-be-predicted daily wind power at a plurality of set times based on an average value, an upper limit value and a lower limit value of the to-be-predicted daily wind power in the similar scene set.

Wherein, the construction module 71 further comprises:
- a first selection unit for selecting wind speed, wind direction, temperature, humidity and pressure as a first primary selection feature of the to-be-predicted daily wind power;
- a second selection unit for selecting a historical daily wind power with an absolute value of the Pearson correlation coefficient greater than a preset threshold as a second primary selection feature of the to-be-predicted daily wind power based on the correlation between the each historical daily wind power and the to-be-predicted daily wind power;
- a calculation and determination unit for calculating the Pearson correlation coefficient between the to-be-predicted daily wind power and the first primary selection feature and the second primary selection feature and comparing the absolute value of the Pearson correlation coefficient with the preset threshold to determine the correlation between the to-be-predicted daily wind power and the first primary selection feature and the second primary selection feature;
- a removal unit for removing the primary selection features with very weak correlation or without correlation based on the determination result of the calculation and determination unit;
- a normalization unit for taking remaining primary selection features removed by the removal unit as the impact features of the to-be-predicted daily wind power, and normalizing the features predicted by the data set corresponding to the impact features;
- an integration unit for integrating the normalized features with the to-be-predicted daily wind power in turn based on a preset arrangement sequence, and forming a to-be-predicted daily raw data; and
- a data set unit for constructing an annual raw data sample based on each to-be-predicted daily raw data, and selecting several raw data from the annual raw data sample randomly to construct a raw data set.

Wherein, the cluster generation module 72 further comprises:
- a clustered data set unit for removing the to-be-predicted daily wind power in the raw data set, obtaining the normalized features corresponding to the impact features, and forming a clustered data set;
- a clustered unit for performing k-means clustering on the data in the clustered data set to obtain multi-cluster labels;
- an assigning unit for assigning the labels to each scene in the raw data set;
- a learning unit for introducing a data encoder at a generator input of the auxiliary classification generative adversarial network, and pre-learning the feature of the shallow raw data based on the real wind power and its impact feature data to obtain a random noise input;
- a generator unit for generating a large amount of sample data satisfying the probability distribution feature of real samples by a generator based on the random noise;
- a discriminator unit for discriminating the quality of the generated samples by a discriminator based on the generated sample data by the generator unit and a raw sample data, and realizing the expansion of the training sample data; and
- an optimization generation unit for performing an iterative process by the robust auxiliary classification generative adversarial network to carry out game optimization in the direction of reducing the impact of noise, and finally generating a large number of labelled samples of the wind power and its impact features under a noise interference.

Wherein, the screening composition module 73 further comprises:
- a search unit for finding the corresponding generated samples in the massive labelled scenes based on the cluster labels of the predicted day;
- a setting unit for setting the Pearson correlation coefficient between the to-be-predicted daily wind power and the impact feature as the weight coefficient, and setting the weighted PCC as $PCC_j$ of all the impact features of the to-be-predicted daily wind power and the corresponding feature between the j-th generated sample; and
- a similar scene set unit for screening out a plurality of samples with a high historical intraday similarity with the extremely strongly correlated day to be predicted from the generated samples corresponding to the cluster labels based on the descending order of $PCC_j$, and forming a similar scene set.

Wherein, the prediction module 74 further comprises:
- an extraction unit for extracting and defining the to-be-predicted daily wind power scene in the similar scene set as a set z; and
- a prediction unit for obtaining the point prediction and interval prediction results of the to-be-predicted daily wind power at a plurality of set times based on the average value, upper and lower limit values of each time period in the set z.

The system for predicting a day-ahead wind power of wind farms in the preferred embodiment of the present invention further comprises:

a first screening module for utilizing the mean absolute percentage error to analyze the point prediction results of the wind power under different numbers of screening samples; and a second screening module for utilizing the coverage ratio of the prediction interval and the normalized average width of the prediction interval to analyze the interval prediction results of the wind power under different numbers of screening samples.

It should be noted that other corresponding descriptions of the functional modules involved in the system for predicting a day-ahead wind power of wind farms in the preferred embodiment of the present invention can refer to the corresponding descriptions of the methods shown in FIGS. 4 and 5, and details are not repeated here.

Based on the above methods as shown in FIGS. 4 and 5, correspondingly, the preferred embodiment of the present invention also provides a computer-readable storage medium on which a computer program is stored, and when the program is executed by a processor, the following steps are implemented: constructing a raw data set containing a numerical weather forecast meteorological feature and a to-be-predicted daily wind power based on a correlation between the to-be-predicted daily wind power, the numerical weather forecast meteorological feature and a historical daily wind power; removing the to-be-predicted daily wind power in the raw data set, obtaining a clustered data set and performing k-means clustering, obtaining a raw data set with cluster labels, and generating massive labelled scenes based on robust auxiliary classifier generative adversarial networks; determining the cluster label category of the to-be-predicted day based on the known historical daily wind power and numerical weather forecast meteorological feature, and screening out multiple scenes with high similarity to the to-be-predicted daily wind power from the massive labelled scenes based on the cluster label category, forming a similar scene set; and obtaining the point prediction and interval prediction results of the to-be-predicted daily wind power at a plurality of set times based on an average value, an upper limit value and a lower limit value of the to-be-predicted daily wind power in the similar scene set.

Figure 8:
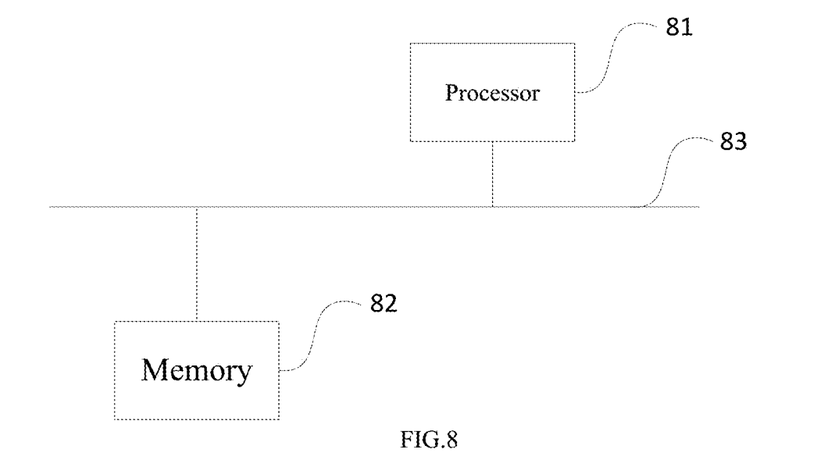
FIG. 8 is an entity structure schematic diagram of a computer device provided in the preferred embodiment of the present invention.

Based on the above embodiments of the methods shown in FIGS. 4 and 5 and the system shown in FIG. 7, the preferred embodiment of the present invention also provides a physical structure diagram of a computer device. As shown in FIG. 8, the computer device comprises a processor 81, a memory 82 and a computer program stored on the memory 82 and running on the processor, wherein the memory 82 and the processor 81 are arranged on the bus 83, and the processor 81 implements the following steps when executing the program: constructing a raw data set containing a numerical weather forecast meteorological feature and a to-be-predicted daily wind power based on a correlation between the to-be-predicted daily wind power, the numerical weather forecast meteorological feature and a historical daily wind power; removing the to-be-predicted daily wind power in the raw data set, obtaining a clustered data set and performing k-means clustering, obtaining a raw data set with cluster labels, and generating massive labelled scenes based on robust auxiliary classifier generative adversarial networks; determining the cluster label category of the to-be-predicted day based on the known historical daily wind power and numerical weather forecast meteorological feature, and screening out multiple scenes with high similarity to the to-be-predicted daily wind power from the massive labelled scenes based on the cluster label category, forming a similar scene set; and obtaining the point prediction and interval prediction results of the to-be-predicted daily wind power at a plurality of set times based on an average value, an upper limit value and a lower limit value of the to-be-predicted daily wind power in the similar scene set.

Obviously, those skilled in the art should understand that the above-mentioned modules or steps of the present invention can be implemented by a general-purpose computing device, and they can be centralized on a single computing device or distributed in a network composed of multiple computing devices. Alternatively, they may be implemented in program code executable by a computing device, such that they may be stored in a storage device and executed by the computing device, and in some cases, the steps shown or described can be executed in a different order from that here, or they can be made into individual integrated circuit modules, or multiple modules or steps of them can be made into a single integrated circuit module. As such, the present invention is not limited to any particular combination of hardware and software.

In practical applications, each functional module and unit provided in the preferred embodiment of the present invention may be implemented by a computer program running on computer hardware, and the program may be stored in a computer-readable storage medium. The program may include the processes of the embodiments of the above-mentioned methods when being executed. Wherein, the hardware is a server or a desktop computer, a notebook computer and so on including one or more processors and storage medium; the storage medium may be a magnetic disk, an optical disc, a Read-Only Memory (ROM) or a Random Access Memory (RAM), etc.; the computer program is implemented by not limited to C, C++ and other computer languages.

The preferred embodiment further describes the objects, technical scheme and beneficial effects of the present invention in detail. It should be understood that the foregoing description is only intended to illustrate a specific embodiment of the invention and not to limit the invention. Any modification, equivalent replacement and improvement made to the embodiment without departing from the spirit and principles of the invention should fall within the protection scope of the invention.

What is claimed is:

1. A method for predicting a day-ahead wind power of a wind farm, comprising:

constructing a raw data set containing a numerical weather forecast meteorological feature and a to-be-predicted daily wind power based on a correlation between the to-be-predicted daily wind power and each of the numerical weather forecast meteorological feature and a historical daily wind power;

removing the to-be-predicted daily wind power in the raw data set, obtaining a clustered data set and performing k-means clustering, obtaining a raw data set with cluster labels, and generating massive labelled scenes based on robust auxiliary classifier generative adversarial networks;

determining a cluster label category of a to-be-predicted day based on the historical daily wind power and the numerical weather forecast meteorological feature, and screening out multiple scenes with high similarity to the to-be-predicted daily wind power from the massive labelled scenes based on the cluster label category, forming a similar scene set;

obtaining point prediction and interval prediction results of the to-be-predicted daily wind power at a plurality of set times based on an average value, an upper limit value and a lower limit value of the to-be-predicted daily wind power in the similar scene set; and dispatching wind power of the wind farm stably and optimally based on the point prediction and interval prediction results.

2. The method of claim 1, wherein the step of based on a correlation between the to-be-predicted daily wind power and each of the numerical weather forecast meteorological feature and a historical daily wind power comprises:

selecting a wind speed, a wind direction, a temperature, a humidity and a pressure as a first primary selection feature of the to-be-predicted daily wind power;

selecting a historical daily wind power with an absolute value of a Pearson correlation coefficient greater than a preset threshold as a second primary selection feature of the to-be-predicted daily wind power based on the correlation between the historical daily wind power and the to-be-predicted daily wind power;

calculating a second Pearson correlation coefficient between the to-be-predicted daily wind power and each of the first primary selection feature and the second primary selection feature; and comparing an absolute value of the second Pearson correlation coefficient with the preset threshold to determine a correlation between the to-be-predicted daily wind power and each of the first primary selection feature and the second primary selection feature.

3. The method of claim 2, wherein the calculation formula of a Pearson correlation coefficient is as follows:

$$PCC(x, y_i) = 1 - \frac{\sum_{k=1}^{n}(x_k - \bar{x})(y_{ik} - \bar{y_i})}{\sqrt{\sum_{k=1}^{n}(x_k - \bar{x})}\sqrt{\sum_{k=1}^{n}(y_{ik} - \bar{y_i})}}$$

wherein, x is the to-be-predicted daily wind power, $y_i$ is an impact feature of the to-be-predicted daily wind power; $x_k$ and $y_{ik}$ are the k-th data in x and $y_i$; $\bar{x}$ and $\bar{y_i}$ are average values of x and $y_i$; k and n are positive integers.

4. The method of claim 3, wherein the step of constructing a raw data set containing a numerical weather forecast meteorological feature and a to-be-predicted daily wind power comprises:

removing primary selection features with very weak correlation or without correlation based on a correlation determination result between the to-be-predicted daily wind power and each of the first primary selection feature and the second primary selection feature;

taking remaining primary selection features as the impact features of the to-be-predicted daily wind power, and normalizing the features predicted by a data set corresponding to the impact features;

integrating the normalized features with the to-be-predicted daily wind power in turn based on a preset arrangement sequence, and forming a to-be-predicted daily raw data; and constructing an annual raw data sample based on the to-be-predicted daily raw data and selecting several raw data from the annual raw data sample randomly to construct a raw data set.

5. The method of claim 4, wherein the step of removing the to-be-predicted daily wind power in the raw data set, obtaining a clustered data set and performing k-means clustering, obtaining a raw data set with cluster labels comprises:

removing the to-be-predicted daily wind power in the raw data set, obtaining the normalized features corresponding to the impact features, and forming the clustered data set;

performing k-means clustering on the data in the clustered data set to obtain multiple cluster labels; and assigning the cluster labels to each scene of a plurality of scenes in the raw data set.

6. The method of claim 5, wherein the k-means clustering is to cluster n data objects into k classes, so that the data objects in each class have the highest similarity, and repeat the process of clustering n data objects until a division is completed, the k-means clustering comprises the following steps: 1) determining the number of clusters k, and select k initial cluster centers in the data in the clustered data set arbitrarily; 2) calculating the distances from all data points to the cluster centers, and classifying the data in the clustered data set into categories based on a principle of minimum distance; and 3) utilizing a mean value method to update the center of each of the k clusters iteratively until an end of the iteration based on a feature of each of the k clusters.

7. The method of claim 6, wherein the step of generating massive labelled scenes based on robust auxiliary classifier generative adversarial networks comprises:

introducing a data encoder at a generator input of the auxiliary classification generative adversarial networks, and pre-learning a feature of shallow raw data based on a real wind power and its impact feature data to obtain a random noise input;

generating a large amount of sample data satisfying a probability distribution feature of real samples by a generator based on the random noise input;

discriminating a quality of the generated samples data by a discriminator based on the generated sample data and a raw sample data, and realizing an expansion of training sample data; and performing an iterative process by the robust auxiliary classification generative adversarial networks to carry out game optimization in a direction of reducing an impact of noise, and finally generating a large number of labelled samples of wind power and its impact features under a noise interference.

8. The method of claim 7, wherein the step of screening out multiple scenes with high similarity to the to-be-predicted daily wind power from the massive labelled scenes based on the cluster label category, forming a similar scene set comprises:

finding corresponding generated samples in the massive labelled scenes based on the cluster labels of the to-be-predicted day;

setting the Pearson correlation coefficient between the to-be-predicted daily wind power and the impact feature as a weight coefficient, and setting a weighted PCC as $PCC_j$ of all the impact features of the to-be-predicted daily wind power and a corresponding feature of the j-th generated sample, the expressing formula is as fellow:

$$PCC_j = \frac{\sum_{i=1}^{7} PCC(y_i, y_{ji}) \cdot PCC(x, y_i)}{\sum_{i=1}^{7} PCC(x, y_i)}$$

wherein, PCC(x, $y_i$) is a PCC between the to-be-predicted daily wind power and the impact feature i; PCC($y_i$,$y_{ji}$) is a PCC between the known impact feature i and the j-th generated sample impact feature i; $PCC_j$ is a weighted PCC between the j-th generated sample and a feature of the to-be-predicted day; and screening out a plurality of samples with a high historical intraday similarity with the to-be-predicted day from the generated samples corresponding to the cluster labels based on a descending order of $PCC_j$, and forming the similar scene set.

9. The method of claim 8, wherein the step of obtaining point prediction and interval prediction results of the to-be-predicted daily wind power at a plurality of set times based on an average value, an upper limit value and a lower limit value of the to-be-predicted daily wind power in the similar scene set comprises:

extracting and defining a to-be-predicted daily wind power scene in the similar scene set as a set z; and obtaining the point prediction and interval prediction results of the to-be-predicted daily wind power at the plurality of set times based on the average value, upper and lower limit values of each time period in the set z, as shown in the following formula:

$$P_{wtmax,t} = a(1, t) \quad a = \max[Z]$$
$$P_{wtmin,t} = b(1, t) \quad b = \min[Z] \quad t = (1, 2, \ldots, 24)$$
$$P_{wtmean,t} = c(1, t) \quad c = \operatorname{mean}[Z]$$

wherein, $P_{wtmax,t}$ and $P_{wtmin,t}$ are the upper and lower limit values of the wind power interval prediction at time t; $P_{wtmean,t}$ is the point prediction result of the to-be-predicted daily wind power at time t.

10. The method of claim 9, wherein the computer implemented method further comprises:

utilizing a mean absolute percentage error to analyze the point prediction results of the to-be-predicted daily wind power under different numbers of screening samples, and utilizing a coverage ratio of the prediction interval and a normalized average width of a prediction interval to analyze the interval prediction results of the to-be-predicted daily wind power under different numbers of screening samples.

11. A computer device comprising a memory, a processor and a computer program stored in the memory and running on the processor, wherein the steps of the method in claim 1 are implemented when the computer program is executed by the processor.

12. A nontransitory computer-readable storage medium on which a computer program is stored, wherein the steps of the method in claim 1 are implemented when the computer program is executed by the processor.

13. A computing system for predicting a day-ahead wind power of a wind farm, comprising:

a construction module for constructing a raw data set containing a numerical weather forecast meteorological feature and a to-be-predicted daily wind power based on a correlation between the to-be-predicted daily wind power and each of the numerical weather forecast meteorological feature and a historical daily wind power;

a cluster generation module for removing the to-be-predicted daily wind power in the raw data set, obtaining a clustered data set and performing k-means clustering, obtaining a raw data set with cluster labels, and generating massive labelled scenes based on robust auxiliary classifier generative adversarial networks;

a screening composition module for determining a cluster label category of a to-be-predicted day based on the historical daily wind power and the numerical weather forecast meteorological feature, and screening out multiple scenes with high similarity to the to-be-predicted daily wind power from the massive labelled scenes based on the cluster label category, forming a similar scene set;

a prediction module for obtaining point prediction and interval prediction results of the to-be-predicted daily wind power at a plurality of set times based on an average value, an upper limit value and a lower limit value of the to-be-predicted daily wind power in the similar scene set; and a module for dispatching wind power of the wind farm stably and optimally based on the point prediction and interval prediction results.

14. The system of claim 13, wherein the construction module further comprises:

a first selection unit for selecting wind speed, wind direction, temperature, humidity and pressure as a first primary selection feature of the to-be-predicted daily wind power;

a second selection unit for selecting a historical daily wind power with an absolute value of a Pearson correlation coefficient greater than a preset threshold as a second primary selection feature of the to-be-predicted daily wind power based on the correlation between the historical daily wind power and the to-be-predicted daily wind power;

a calculation and determination unit for calculating a second Pearson correlation coefficient between the to-be-predicted daily wind power and each of the first primary selection feature and the second primary selection feature and comparing an absolute value of the second Pearson correlation coefficient with the preset threshold to determine a correlation between the to-be-predicted daily wind power and each of the first primary selection feature and the second primary selection feature;

a removal unit for removing the primary selection features with very weak correlation or without correlation based on a determination result of the calculation and determination unit;

a normalization unit for taking remaining primary selection features after the removing by the removal unit as the impact features of the to-be-predicted daily wind power, and normalizing the features predicted by a data set corresponding to the impact features;

an integration unit for integrating the normalized features with the to-be-predicted daily wind power in turn based on a preset arrangement sequence, and forming a to-be-predicted daily raw data; and a data set unit for constructing an annual raw data sample based on the to-be-predicted daily raw data, and selecting several raw data from the annual raw data sample randomly to construct a raw data set.

15. The system of claim 14, wherein the cluster generation module further comprises:

a clustered data set unit for removing the to-be-predicted daily wind power in the raw data set, obtaining the normalized features corresponding to the impact features, and forming the clustered data set;

a clustered unit for performing k-means clustering on data in the clustered data set to obtain multiple cluster labels;

an assigning unit for assigning the cluster labels to each scene of a plurality of scenes in the raw data set;

a learning unit for introducing a data encoder at a generator input of the auxiliary classification generative adversarial networks, and pre-learning a feature of shallow raw data based on a real wind power and its impact feature data to obtain a random noise input;

a generator unit for generating a large amount of sample data satisfying the probability distribution feature of real samples by a generator based on the random noise input;

a discriminator unit for discriminating a quality of the generated sample data by a discriminator based on the generated sample data by the generator unit and a raw sample data, and realizing an expansion of training sample data; and an optimization generation unit for performing an iterative process by the robust auxiliary classification generative adversarial networks to carry out game optimization in a direction of reducing an impact of noise, and finally generating a large number of labelled samples of the wind power and its impact features under a noise interference.

16. The system of claim 15, wherein the screening composition module further comprises:

a search unit for finding corresponding generated samples in the massive labelled scenes based on the cluster labels of the to be predicted day;

a setting unit for setting the Pearson correlation coefficient between the to-be-predicted daily wind power and the impact feature as a weight coefficient, and setting a weighted PCC as $PCC_j$ of all the impact features of the to-be-predicted daily wind power and a corresponding feature of the j-th generated sample; and a similar scene set unit for screening out a plurality of samples with a high historical intraday similarity with the to-be-predicted day from the generated samples corresponding to the cluster labels based on a descending order of $PCC_j$, and forming the similar scene set.

17. The system of claim 16, wherein the prediction module further comprises:

an extraction unit for extracting and defining a to-be-predicted daily wind power scene in the similar scene set as a set z; and a prediction unit for obtaining the point prediction and interval prediction results of the to-be-predicted daily wind power at the plurality of set times based on the average value, upper and lower limit values of each time period in the set z.

18. The system of claim 17, wherein the system further comprises:

a first screening module for utilizing a mean absolute percentage error to analyze the point prediction results of the to-be predicted daily wind power under different numbers of screening samples; and a second screening module for utilizing a coverage ratio of the prediction interval and a normalized average width of the prediction interval to analyze the interval prediction results of the to be predicted daily wind power under different numbers of screening samples.

* * * * *